United States Patent
On et al.

(10) Patent No.: US 9,904,262 B2
(45) Date of Patent: Feb. 27, 2018

(54) SYSTEMS AND METHODS FOR DYNAMIC OPERATION OF ELECTRONIC DEVICES BASED ON DETECTION OF ONE OR MORE EVENTS

(71) Applicant: Vonage America Inc., Holmdel, NJ (US)

(72) Inventors: Guy Bar On, Tel-Aviv (IL); Sagi Dudai, Tel-Aviv (IL); Natan Shaltiel, Tel-Aviv (IL)

(73) Assignee: Vonage America Inc., Holmdel, NJ (US)

( * ) Notice: Subject to any disclaimer, the term of this patent is extended or adjusted under 35 U.S.C. 154(b) by 204 days.

(21) Appl. No.: 14/727,428

(22) Filed: Jun. 1, 2015

(65) Prior Publication Data

US 2016/0349722 A1    Dec. 1, 2016

(51) Int. Cl.
*G05B 15/02* (2006.01)
*G06F 3/048* (2013.01)
(Continued)

(52) U.S. Cl.
CPC ............. *G05B 15/02* (2013.01); *G06F 3/048* (2013.01); *H04L 12/6418* (2013.01);
(Continued)

(58) Field of Classification Search
CPC ............... G05B 15/02; H04L 12/6418; H04M 1/72533; H04M 1/72569; H04M 1/7253; G06F 3/048
See application file for complete search history.

(56) References Cited

U.S. PATENT DOCUMENTS 5,586,268 A * 12/1996 Chen .................... G06F 13/102
                                                710/100
5,631,902 A *  5/1997 Yoshifuji ................. H04J 3/14
                                                340/2.24
(Continued)

FOREIGN PATENT DOCUMENTS

EP          0122705 A2   10/1984
WO    WO-2013128069 A1    9/2013

OTHER PUBLICATIONS

International Search Report and Written Opinion dated Aug. 29, 2016 for Application No. PCT/US2016/035182, 14 pages.

*Primary Examiner* — Ramesh Patel
(74) *Attorney, Agent, or Firm* — Moser Taboada; Joseph Pagnotta

(57) ABSTRACT

A method and a system for dynamically controlling at least one electronic device of a plurality of electronic devices in a common operating environment are provided. According to an embodiment, a method for dynamically controlling at least one electronic device comprises storing, in a memory, user input for automatically controlling operation of a first electronic device of a plurality of electronic devices while a second electronic device of the plurality of electronic devices is being operated, detecting, by a processor, a first state transition event affecting an operating state of at least one of the first electronic device or second electronic device and, based on the stored input and detected state transition event, processing instructions for at least one of modifying or suspending operation of at least one feature of the first or second electronic devices.

24 Claims, 10 Drawing Sheets

(51) Int. Cl.
*H04M 1/725* (2006.01)
*H04L 12/64* (2006.01)
(52) U.S. Cl.
CPC ..... *H04M 1/7253* (2013.01); *H04M 1/72533* (2013.01); *H04M 1/72569* (2013.01)

(56) References Cited

U.S. PATENT DOCUMENTS

| | | | | |
|---|---|---|---|---|
| 5,640,596 | A * | 6/1997 | Takamoto | G06F 13/126 710/21 |
| 5,785,597 | A * | 7/1998 | Shinohara | A63F 13/06 463/43 |
| 7,136,709 | B2 * | 11/2006 | Arling | G05B 15/02 340/3.1 |
| 8,319,608 | B2 * | 11/2012 | Hanif | H04L 12/2816 340/7.27 |
| 9,026,098 | B2 * | 5/2015 | Naftolin | H04W 8/22 455/418 |
| 2005/0096753 | A1 * | 5/2005 | Arling | G05B 15/02 700/11 |
| 2008/0167931 | A1 * | 7/2008 | Gerstemeier | G06Q 10/06 705/7.22 |
| 2010/0112945 | A1 * | 5/2010 | Hanif | H04L 12/2816 455/41.2 |
| 2013/0052991 | A1 * | 2/2013 | Naftolin | H04W 8/22 455/411 |

* cited by examiner

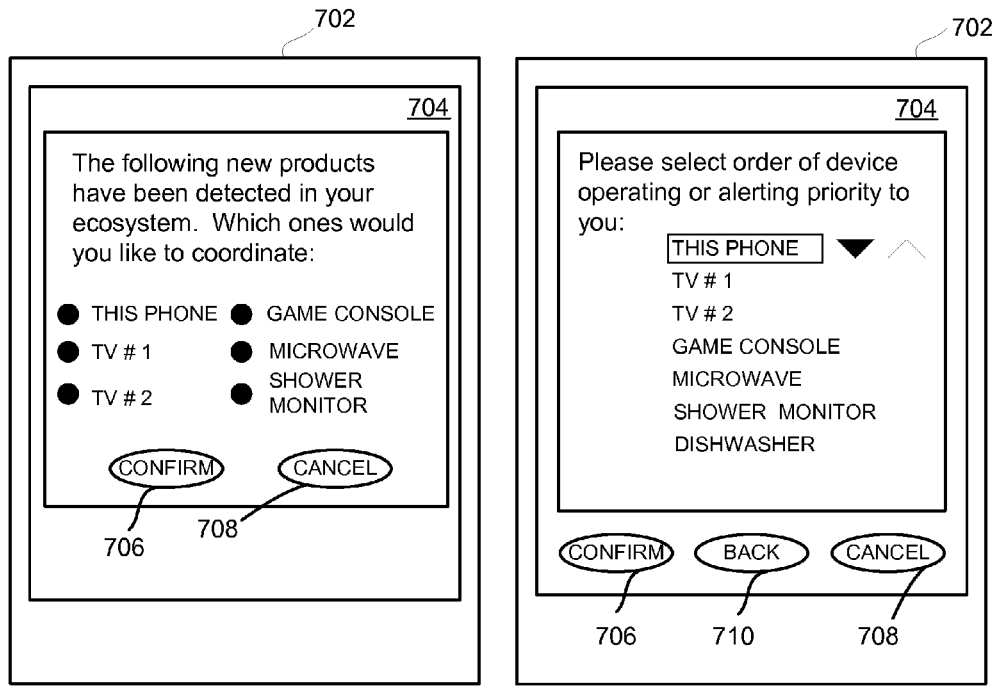
FIG. 7A      FIG. 7B
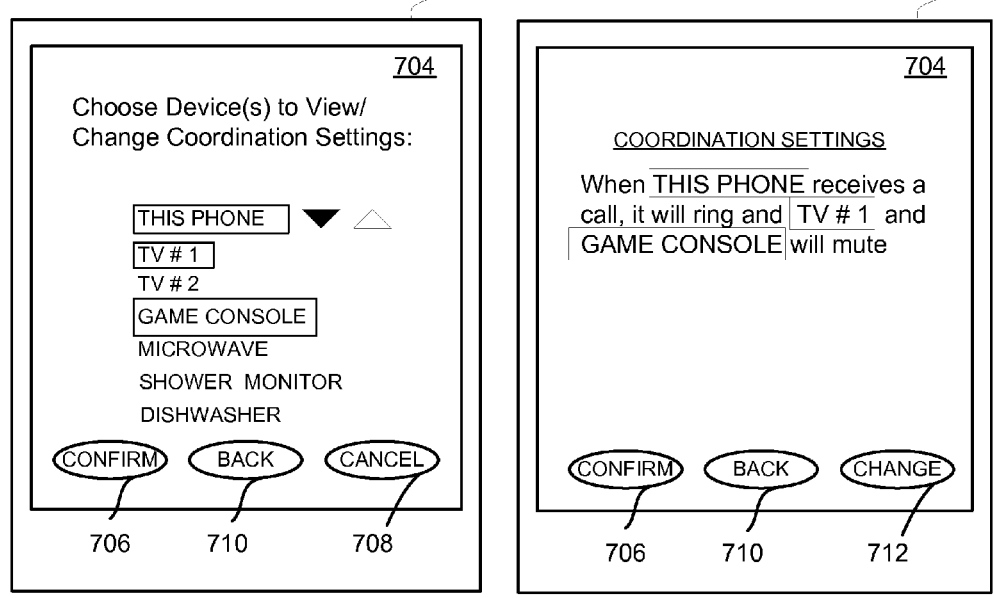
FIG. 7C      FIG. 7D

SYSTEMS AND METHODS FOR DYNAMIC OPERATION OF ELECTRONIC DEVICES BASED ON DETECTION OF ONE OR MORE EVENTS

BACKGROUND

Field

Embodiments consistent with the present invention generally relate to systems and methods for dynamically operating at least one device of a plurality of devices, in a common operating environment.

Description of the Related Art

Advances in microprocessor design, memory capacity, and display technology have led to a proliferation of intelligent electronic devices. Such intelligent devices include communications terminals (e.g., smartphones, tablet computers, personal computers, facsimile machines, and landline telephones), sophisticated entertainment systems (e.g., high definition televisions, digital audio receivers, interactive gaming systems, and media players), and even programmable food storage or preparation appliances such as refrigerators, ovens (e.g., conventional and microwave), coffee makers, blenders, food processors, or cleaning appliances such as dishwashers, washing machines, and clothes dryers.

While the aforementioned electronic devices have become increasingly rich in both features and utility, their respective user interfaces have become far more complex and difficult for the average user to coordinate. In a home, car or office environment comprising a plurality of electronic devices which does not vary substantially over time (i.e., a "static: device ecosystem"), the constituent electronic devices may be manually configured to preferentially preserve a positive user experience for any one of the devices even when other devices are being operated at the same time. For example, in a room where an entertainment system is being used to play music at a relatively high volume level, a user may manually configure his or her mobile terminal device to vibrate when an incoming call is received and then, reduce the volume of an audio receiver before answering an incoming call.

Manual configuration is cumbersome enough in a static environment, whether because a single user has shifting device preferences over the course of a day or because multiple users sharing the same operating environment have conflicting preferences. However, marketing studies have indicated that approximately 90% of users of a particular class of electronic devices tend to use only about 10% of the features available. In a dynamic ecosystem, where at least one of the devices may be carried into or leave the operating environment by a single user at any time and/or where others may be operated by multiple users having conflicting preferences, the task of manually coordinating multiple devices has become so difficult as to be entirely impracticable for many users.

A need therefore exists for systems and methods by which one or more electronic devices, in a home, office and/or vehicular ecosystem comprising a plurality of electronic devices, are dynamically configurable and automatically responsive to changes in the state of one or more other devices so as to maintain an acceptable user experience.

SUMMARY

A method and a system for dynamically controlling at least one electronic device of a plurality of electronic devices in a common operating environment are provided.

In an embodiment, a method for dynamically controlling at least one electronic device comprises storing, in a memory, user input for automatically controlling operation of a first electronic device of a plurality of electronic devices while a second electronic device of the plurality of electronic devices is being operated, detecting, by a processor, a first state transition event affecting an operating state of at least one of the first and second electronic devices and, based on the stored input and detected state transition event, processing instructions for at least one of modifying or suspending operation of at least one feature of the first or second electronic devices.

In another embodiment, a system for dynamically controlling at least one of a plurality of electronic devices in at least temporary proximity with one another, comprises a user interface comprising at least one of a display or a speaker for presentation of at least one of alerts or prompts; at least one processor; and a memory containing instructions executable by the at least one processor. The memory contains instructions executable to store user input for automatically controlling operation of a first electronic device of the plurality of electronic devices while a second electronic device of the plurality of electronic devices is being operated; to detect, by execution of instructions by the at least one processor, a first state transition event affecting an operating state of at least one of the first and second electronic device; and, based on the stored input and detected state transition event, at least one of processing or transmitting instructions for at least one of modifying or suspending operation of at least one feature of the first and second electronic devices.

In yet another embodiment, a system for dynamically controlling at least one of a plurality of electronic devices in at least temporary proximity with one another comprises means for presenting at least one of alerts or prompts to a user of at least one of the plurality of electronic devices; means for automatically controlling operation of a first electronic device of the plurality of electronic devices while a second electronic device of the plurality of electronic devices is being operated; means for detecting a first state transition event affecting an operating state of at least one of the first or second electronic devices; and means for at least one of modifying or suspending operation, based on stored instructions provided by a use and a detected state transition event, of at least one feature of the first and second electronic devices.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other and further embodiments of the present invention are described below.

BRIEF DESCRIPTION OF THE DRAWINGS

So that the manner in which the above recited features of embodiments of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 7A depicts the user interface displayed by a device operated by a user and presenting a prompt for the user to enter input for establishing a subset of devices, in a detected ecosystem, to be coordinated according to the preferences of that user, according to some embodiments;

FIG. 7B depicts the device of FIG. 7A operated by a user to present a default device hierarchy and optionally reorder the hierarchy to suit the preferences of the user, according to some embodiments;

FIG. 7C depicts the device of FIGS. 7A and 7B operated by a user to select, for further evaluation and/or modification, a subset of ecosystem devices and a default set of coordination settings applicable that subset, according to some embodiments;

FIG. 7D depicts the device of FIGS. 7A to 7C operated by a user to select, to view the current (e.g., default) configuration settings of a selected subset of devices forming part of the ecosystem so as to understand the impact, if any, operation of each of the devices to perform one or more functions or features will have on other devices of the subset in response to the occurrence of a specified event.

Figure 1A:
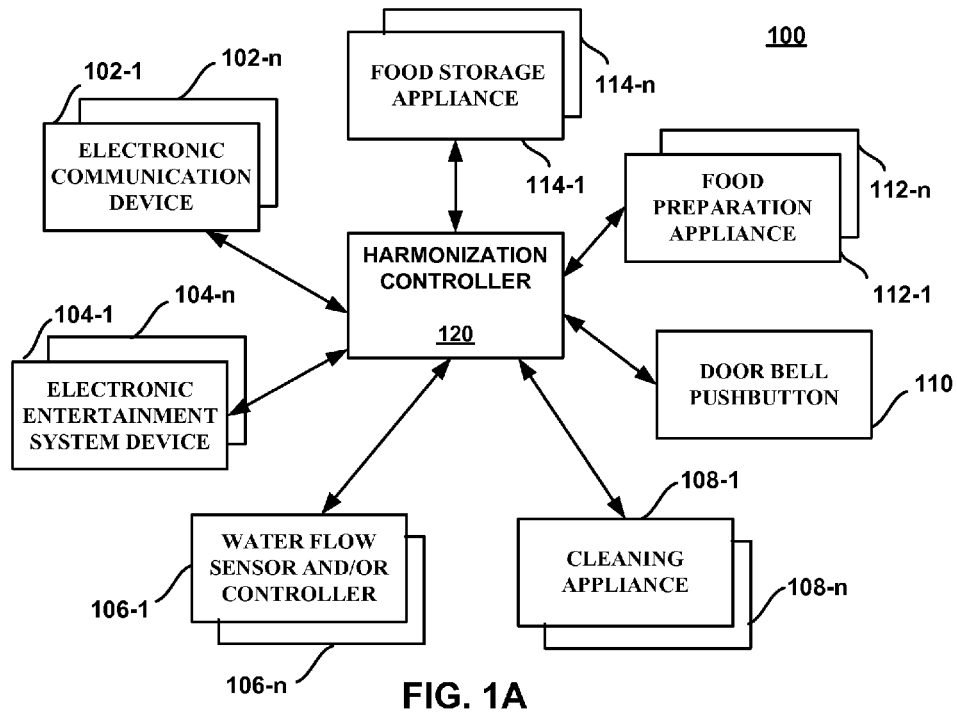
FIG. 1A is a block diagram depicting an electronic device ecosystem comprising a plurality of electronically controlled and/or monitored devices and a harmonization controller to centrally coordinate features, functions and or operating mode status among those devices, according to one or more embodiments of the invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention include a system and method for embedding automatically updateable content in the context of a real-time conversation between two or more participants.

Various embodiments of systems and methods for dynamically controlling at least one electronic device of a plurality of electronic devices in a common operating environment are provided below. In the following detailed description, numerous specific details are set forth to provide a thorough understanding of the claimed subject matter. However, it will be understood by those skilled in the art that claimed subject matter may be practiced without these specific details.

Some portions of the detailed description which follow are presented in terms of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1A depicts a block diagram of a system 100 configured to dynamically control at least one electronic device of a plurality of electronic devices in a common operating environment are provided, according to one or more embodiments of the invention. As used herein, the term "electronic device" in the context of an ecosystem is intended to encompass devices whose features, functions, and/or overall operation are electronically controlled and, as well, devices whose operation and/or behavior is electronically monitored via, for example, one or more sensors.

System 100, therefore, depicts electronically controlled devices as electronic communication devices 102-1 to 102-n (e.g., portable communication devices like smartphones and tablet computers, facsimile machines, and corded or cordless phones), some entertainment system devices as devices 104-1 to 104-n (e.g., televisions, media players, game consoles, water flow controllers 106-1 as for metering flow to a showerhead, bathtub, or sink faucet, digital video recorders and/or players, and set top boxes), some cleaning appliances among appliances 108-1 to 108-n (e.g., clothes washers and dryers, dishwashers, and irons), some food preparation appliances among appliances 112-1 to 112-n (e.g., coffee machines, blenders, microwave ovens, conventional ovens), and some food storage appliances among appliances 114-1 to 114-n (e.g., refrigerator, freezer, ice maker).

System 100 further depicts devices capable of being electronically monitored. As one example, the devices may include water and shower faucets whose flow might be measured (not controlled) by an electronic flow sensor 106-n, with information relating to the operating state of the monitored device (i.e., flow or no flow in a water faucet or shower head) being reported. As a further example, the devices may include audible alerting device 110 commonly found in a home or office as, for example, an intercom or doorbell.

Electronically controlled devices not configured to respond to or automatically report event and/or operating state transition notifications may be monitored via sensors (not shown) associated with or operated by harmonization controller 120. Thus, for example, the output volume of a particular television or media player device may be monitored via a respective ambient sound sensor co-located with each of the other devices of the ecosystem determined, a priori or by configurable settings, to be affected by that output volume. As an example, devices having microphones may be understood by default to be impacted by ambient noise levels and those same microphones may serve as the means by which ambient sound input is monitored.

In an embodiment, electronic communication device 102-1 is configured to periodically transmit sound and/or other measurements to harmonization controller 120 using any suitable transmission protocol and over any conventional communication medium such, for example, as a wireless channel, a network cable, or premises electrical wiring. Suitable wireless transmission protocols, for example, include Bluetooth, IEEE 802.11 or the like. The transmission of measurements may be initiated as a response to a request received from the harmonization controller 120 over the same or a different communication medium. In addition, or alternatively, the reporting may be initiated in response to a change in position on the part of the microphone-equipped devices as device 102-1. That change be determined by the harmonization controller through, for example, triangulation techniques (requiring at least two controller nodes) or by GPS and/or accelerometer input processed at the microphone equipped device(s) themselves.

Figure 1B:
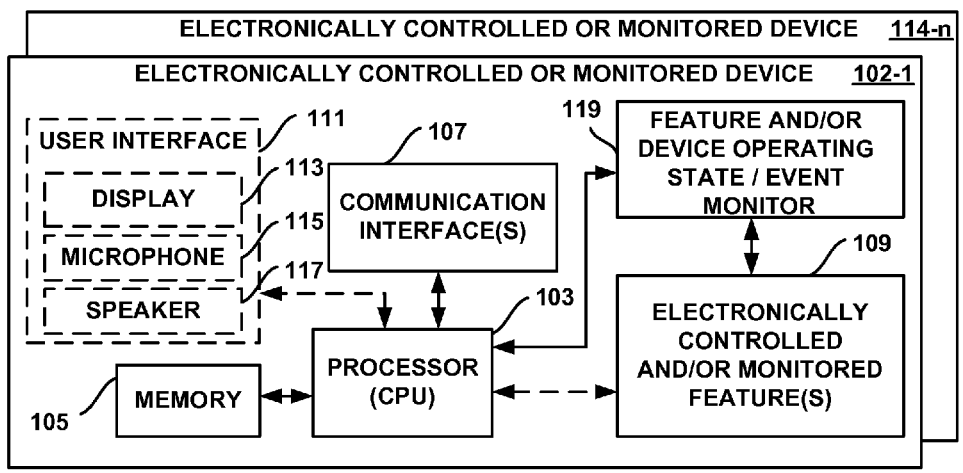
FIG. 1B is a block diagram depicting the components of devices forming part of the exemplary ecosystem of FIG. 1A, according to one or more embodiments of the invention.

FIG. 1B is a block diagram depicting the components of devices 102-1 to 114-n forming part of the exemplary ecosystem of FIG. 1A, according to one or more embodiments of the invention. Device 102-1 is illustrative of devices configured to at least report operating state and event transitions to harmonization controller 120 and includes a processor 103, a memory 105, communication interfaces 107, electronically controlled or monitored features, functions or operating characteristics 109, and a feature and/or device operating state and/or event monitor 119 for determining and/or monitoring the operating state of the device and/or the occurrence of events to be reported to the harmonization controller 120. In some embodiments, device 102-1 is a communication terminal and further includes a user interface 111 which comprises a display 113, a microphone 115, and a speaker 117.

Figure 1C:
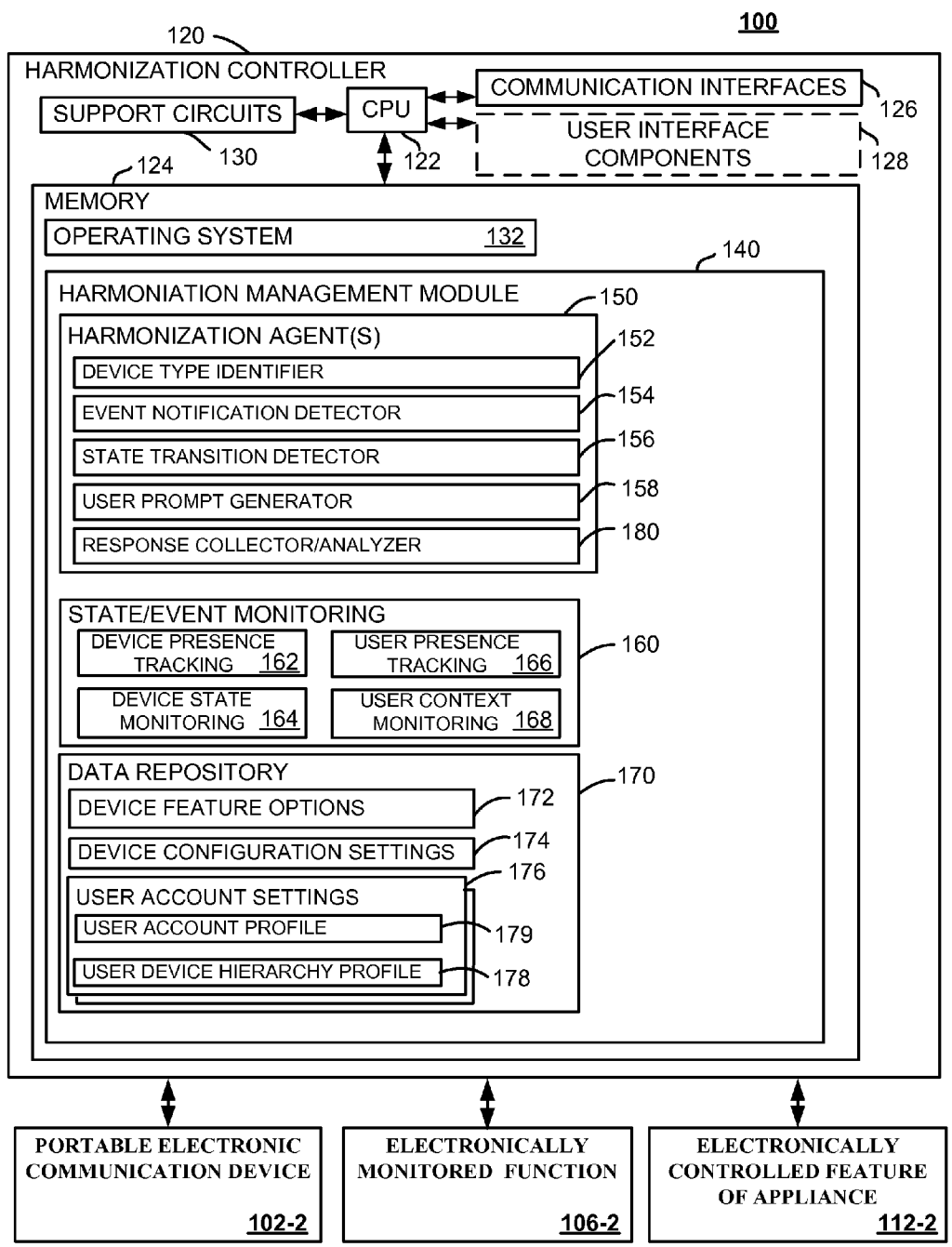
FIG. 1C is a block diagram depicting the components of a harmonization controller forming part of the exemplary system and ecosystem of FIG. 1A, according to one or more embodiments of the invention.

FIG. 1C is a block diagram depicting the components of the harmonization controller 120 forming part of the exemplary system of FIG. 1A, according to one or more embodiments of the invention. According to some embodiments, harmonization controller 120 includes a harmonization module 140 comprising a set of instructions residing in memory 124 and executable by a Central Processing Unit (CPU) 122. The CPU 122 may include one or more commercially available microprocessors or microcontrollers that facilitate data processing and storage. Various support circuits 130 facilitate the operation of the CPU 122 and include one or more clock circuits, power supplies, cache, input/output circuits, and the like. The memory 124 includes at least one of Read Only Memory (ROM), Random Access Memory (RAM), disk drive storage, optical storage, removable storage and/or the like. Communication interfaces 126, operated under the control of CPU 122 perform the exchange of messages between controller 120 and devices of the ecosystem as, for example, devices 102-2, 106-2 and 112-2. In some embodiments, user interface components 128 including, for example, an adjunct display and data entry device (neither of which are shown) are also included. In other embodiments, a device as device 102-2 is used to render prompts to and collect input from a user.

In addition to harmonization management module 140, memory 124 includes an operating system 132, and a plurality of applications which may optionally include a speech-to-text converter (not shown). The operating system (OS) 132 generally manages various computer resources (e.g., network resources, file processors, and/or the like). The operating system 132 is configured to execute operations on one or more hardware and/or software modules, such as Network Interface Cards (NICs), hard disks, virtualization layers, firewalls and/or the like. Examples of the operating system 132 may include, but is not limited to, LINUX, MAC OSX, BSD, UNIX, MICROSOFT WINDOWS, and the like.

In some embodiments, harmonization controller 120 interacts directly with or collects information about the operating state and events affecting operation of a plurality of devices of system 100, as devices 102-2, 106-2 and 112-2. These interactions take place, for one or more of the devices, over a communication network. At least some of the devices, as 102-2, also includes one or more processors, support circuits, and memory containing an operating system and one or more applications (none of which are shown in FIG. 1C). Also associated with the device 102-2 in some embodiments is a display device (not shown) which may comprise a touch screen able to accept input from a user's finger or input from a stylus. In some embodiments, applications of the device 102-2 include a communication session module configured, by execution of instructions by the device CPU, to set up a telephone call or send an SMS, IM chat, or MMS message to an intended recipient via the same or a different communication network.

Harmonization module 140 includes a harmonization agent 150 which directs the exchange of messages between the harmonization module 140 and at least some of devices 102-1 to 114-n and performs the event analysis, transition detection needed to achieve dynamic coordination between those devices. To this end, the harmonization agent 150 includes a device type identifier 152 which, in some embodiments is configured to analyze transmissions received from one or more devices 102-1 to 114-n and identify not only the type of device with which it is communicating, but also the features, functions and/or capabilities of that device. For some devices, the device type identifier 152 may optionally be configured to operate one or more sensors (not shown) to classify/identify a device according, for example, a particular sound signature or the like.

Harmonization agent 150 further includes an event notification detector 154, for determining if an event has occurred which has the potential to or will affect the operating state or functions and/or features being performed by one or more of the monitored devices, and a state transition detector 156 for requesting and/or receiving notifications as to the current operating mode a device is in or is expecting to enter, and/or the feature(s) and/or functions a monitored device is currently performing or expecting to perform. Harmonization agent 150 further includes a user prompt generator 158 for generating and initiating presentation, to the user of a device in communication with the harmonization controller 120, prompts for gathering configuration and user preference input for coordinating the operation of the devices 102-1 to 114-n (FIG. 1A). Lastly, harmonization agent 150 includes a response collector/analyzer 180 to manage storage and analysis of the user input in order to generate further responses and/or confirm or modify default configuration settings for dynamically configuring the devices of system 100 as various events and state transitions occur among those devices.

Other components of harmonization module 140 include a state/event monitoring module 160, which includes a device presence tracker 162 which manages the gathering and storage of data relating to which devices of system 100 are physically present in the ecosystem over time, a device state monitor 164, which manages the gathering and storage of data relating to what operating state and/or feature(s) and/or function(s) are being used by a device, while in the ecosystem, over time, a user presence tracker 166 which manages the gathering and storage of data relating to the presence of a particular user in the ecosystem over time (as may be determined by an association with a particular device, for example), and a user context monitor 168, which manages the gathering and storage of data relating to the activities in which a particular user is engaged, within the ecosystem, over time. The data collected is stored in data repository 170.

The data within data repository 170 is accessed by the event notification detector 154 and state transition detector 156 of harmonization agent 150 in order to determine when an action should be taken to affect what would otherwise be a default action of one of the devices present within system 100. Data repository 170 contains device feature options 172, device configuration settings 174, and user account settings 176 comprising one or more user account profile(s) 179 and at least one user device hierarchy profile 178. In an embodiment, where a set of feature and/or function options are known for a particular device determined to be present within the ecosystem, these may be pre-populated by default within device feature options store 172. In an embodiment, where a particular device has been configured by a user to perform certain functions in response to events detectable by or reported to harmonization controller 120, those configured functions are stored for that device in the device configuration settings store 174. Likewise, where certain features of a device have been enabled and others disabled by the user, these too are stored in the device configuration settings store.

Figure 2A:
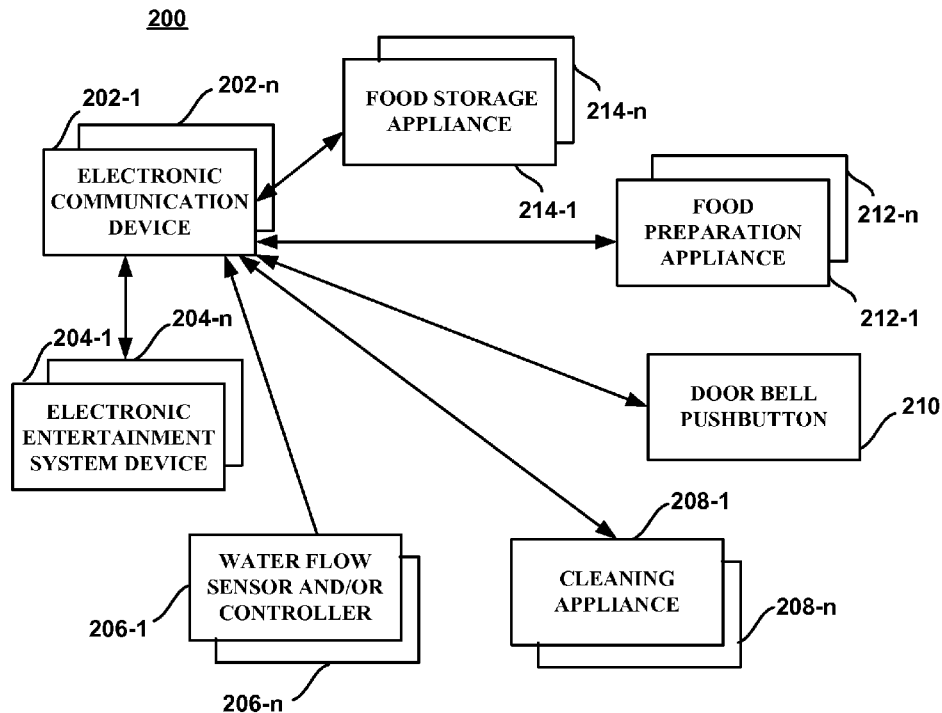
FIG. 2A is a block diagram depicting an electronic device ecosystem comprising a plurality of electronically controlled and/or monitored devices wherein at least one of the plurality is configured to coordinate its features, functions and or operating mode status with at least one other of the plurality, according to one or more embodiments of the invention.
Figure 2B:
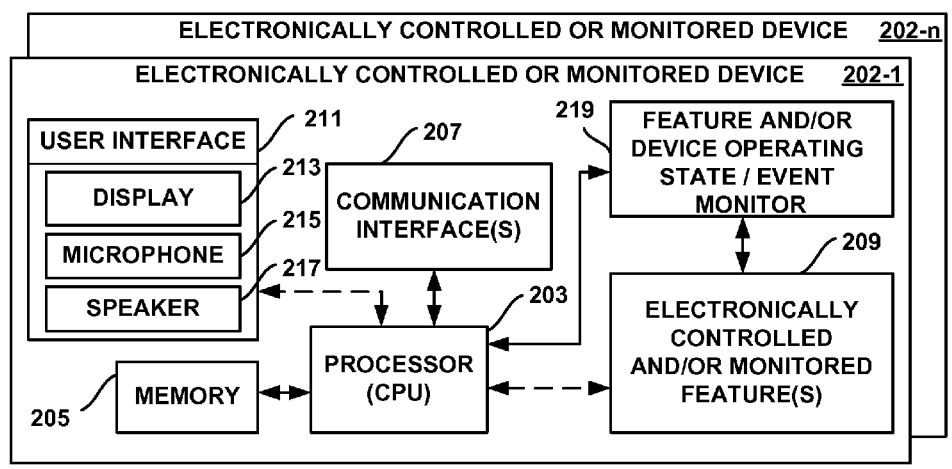
FIG. 2B is a block diagram depicting the components of one or more devices of a first type which may form part of the exemplary ecosystem of FIG. 2A, according to one or more embodiments of the invention.
Figure 2C:
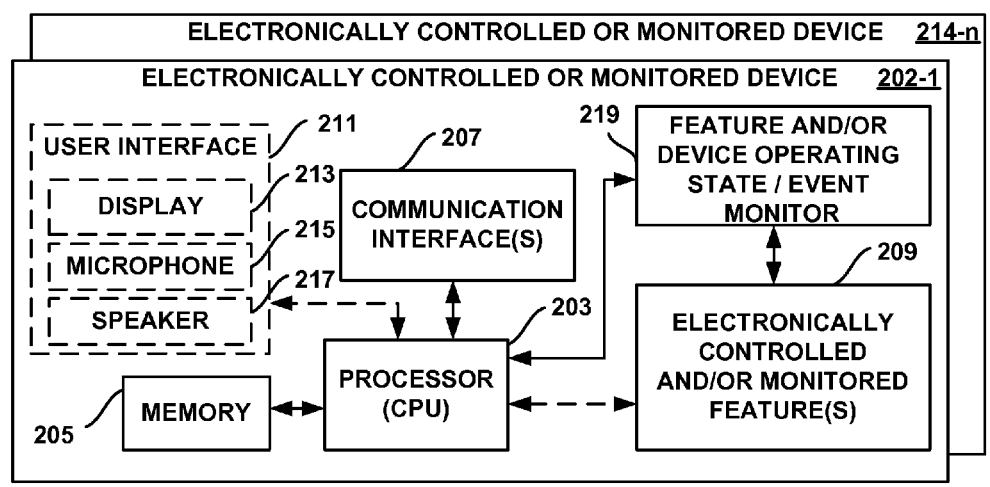
FIG. 2C is a block diagram depicting the components of devices of a second type which may also form part of the exemplary ecosystem of FIG. 2A, according to one or more embodiments of the invention.

FIG. 2A is a block diagram depicting ecosystem comprising a system 200 that includes a plurality of electronically controlled and/or monitored devices 202-1 to 214-n wherein at least one of the plurality (e.g., communication terminal device 202-1) is configured to coordinate its features, functions and or operating mode status with at least one other of the plurality, according to one or more embodiments of the invention. FIG. 2B is a block diagram depicting the components of one or more devices of a first type which may form part of the exemplary ecosystem of FIG. 2A, according to one or more embodiments of the invention, while FIG. 2C is a block diagram depicting the components of devices of a second type which may also form part of the exemplary ecosystem of FIG. 2A, according to one or more embodiments of the invention.

Comparing FIGS. 1A and 2A, the key distinction is that the centralized topology is replaced by a peer-to-peer topology. Accordingly, at least one of the devices must possess the ability to perform at least those functions of the harmonization controller needed to coordinate the behavior of that device relative to the operating state of at least one other device of system 200.

In an embodiment, device 202-1 of FIGS. 2A and 2B is an electronic communication device configured identically to the one shown in FIG. 1B, except with the inclusion of the user interface 211 and its constituent display 213, microphone 215, and speaker 217 indicated as optional in FIG. 1B. As shown in FIG. 2C, however, the user interface components may, but need not be present in other devices of system 200 as, for example, devices 204-1 to 214-n.

Figure 3:
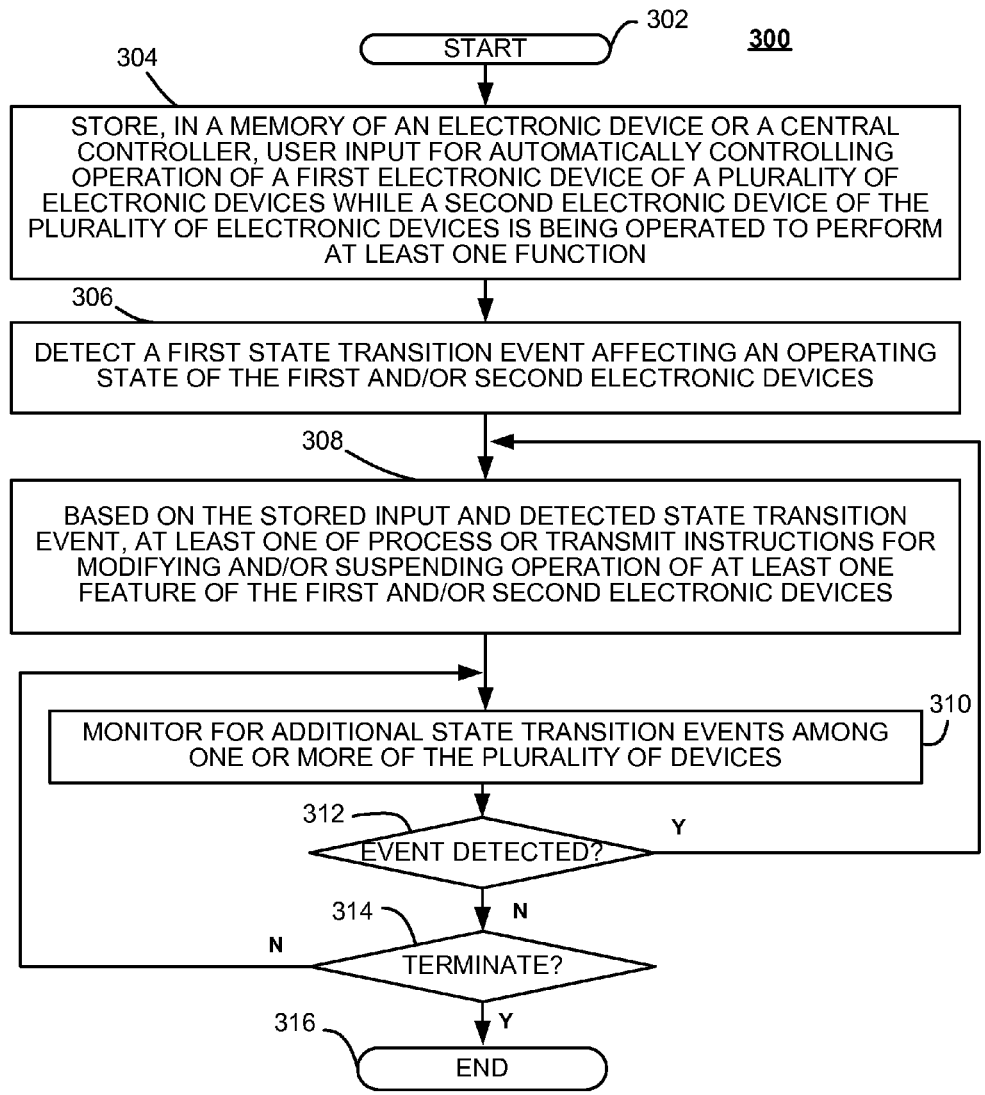
FIG. 3 is a flow diagram of a method for dynamically coordinating the features, functions and or operating mode status of a plurality of electronically controlled and/or monitored devices in a device ecosystem, according to one or more embodiments of the invention.

FIG. 3 is a flow diagram of a method 300 for dynamically coordinating the features, functions and or operating mode status of a plurality of electronically controlled and/or monitored devices in a device ecosystem, according to one or more embodiments of the invention. The method 300 starts at 302, and generally proceeds to 304. At 304, user input for use in confirming, modifying and/or establishing one or more rules for automatically and dynamically controlling operation of at least a first electronic device while at least a second electronic device is being operated to perform at least one function.

In some embodiments, the rule(s) made applicable to the operation of one type of electronic device by default or at 304 differ(s) from the rule(s) made applicable by default or at 304 to the operation of one or more other types of electronic devices, and the rule(s) made applicable by default or at 304 to operation of one device of the same type can also differ from the rule(s) made applicable at by default or at 304 to operation of another device of the same type. Even the rule(s) made applicable by default or at 304 to the same device can change from one time interval to the next depending, for example, on whether or not a particular event has occurred, on whether another device or combination of devices is being operated in the same ecosystem, on the presence (or absence) of a particular user or combination of users, or even on the activities in which a particular user is engaged (i.e., that user's context).

The method 300 proceeds to 306, where a first state transition event is detected which affects an operating state of the first electronic device and/or the second electronic device. The method 300 then proceeds to 308. At 308, based on the input stored in memory at 304 and the detected state transition event, one or more instructions are processed and/or transmitted so that at least one feature of the first and/or second electronic devices is modified and/or suspended. The method 300 then proceeds to 310.

At 310, monitoring is initiated to detect the occurrence of one or more concurrent or subsequent state transition events among the devices forming an ecosystem. The method 300 then proceeds to 312, where a determination is made as to whether the subsequent or concurrent state transition event(s) affect an operating state of the first and/or second electronic devices. If the determination at 312 is yes, then the method 300 returns to 308 and, based on the applicable rules and detected state transition event(s), instructions for suspending and/or further modifying the operation of the first and/or second electronic devices. Examples of modifications can include disabling one or more features of the first and/or second electronic device(s), re-enabling one or more features of the first and/or second electronic device(s), and/or operating the first and/or second electronic device(s) according to respectively different modes of operation to maintain a positive user experience.

If the determination at 312 is no, then the method 300 proceeds to 314 and a further determination is made as to whether method 300 should terminate. If not, the method returns to step 310 and continues to monitor for additional state transition events. If the determination at 314 is yes, the method 300 instead proceeds to 316 where the method terminates.

A rule made applicable at 304 of method 300 may specify, in some embodiments, that when a particular triggering event occurs at a first device such that the mode in which that first device is operated changes, the operation of one or more other devices will be constrained and/or enhanced in some way until the first device reverts to its prior operating mode (or to a different operating mode which is unaffected by the operation of such other devices). Where the first device is a communication terminal, examples of triggering events processed according to embodiments of method 300 include receipt of an invitation to join a communication session (e.g., requiring generation of an alert to the user), operation of the first device to accept a call set up invitation (e.g., requiring operation of a microphone and/or speaker of, or paired with, the first device), or operation of the first device to send a call setup invitation to a remote party (e.g. to place an outgoing call). An exemplary embodiment depicting operation of a second device according to a triggering event at a first device is depicted in FIG. 4.

Figure 4:
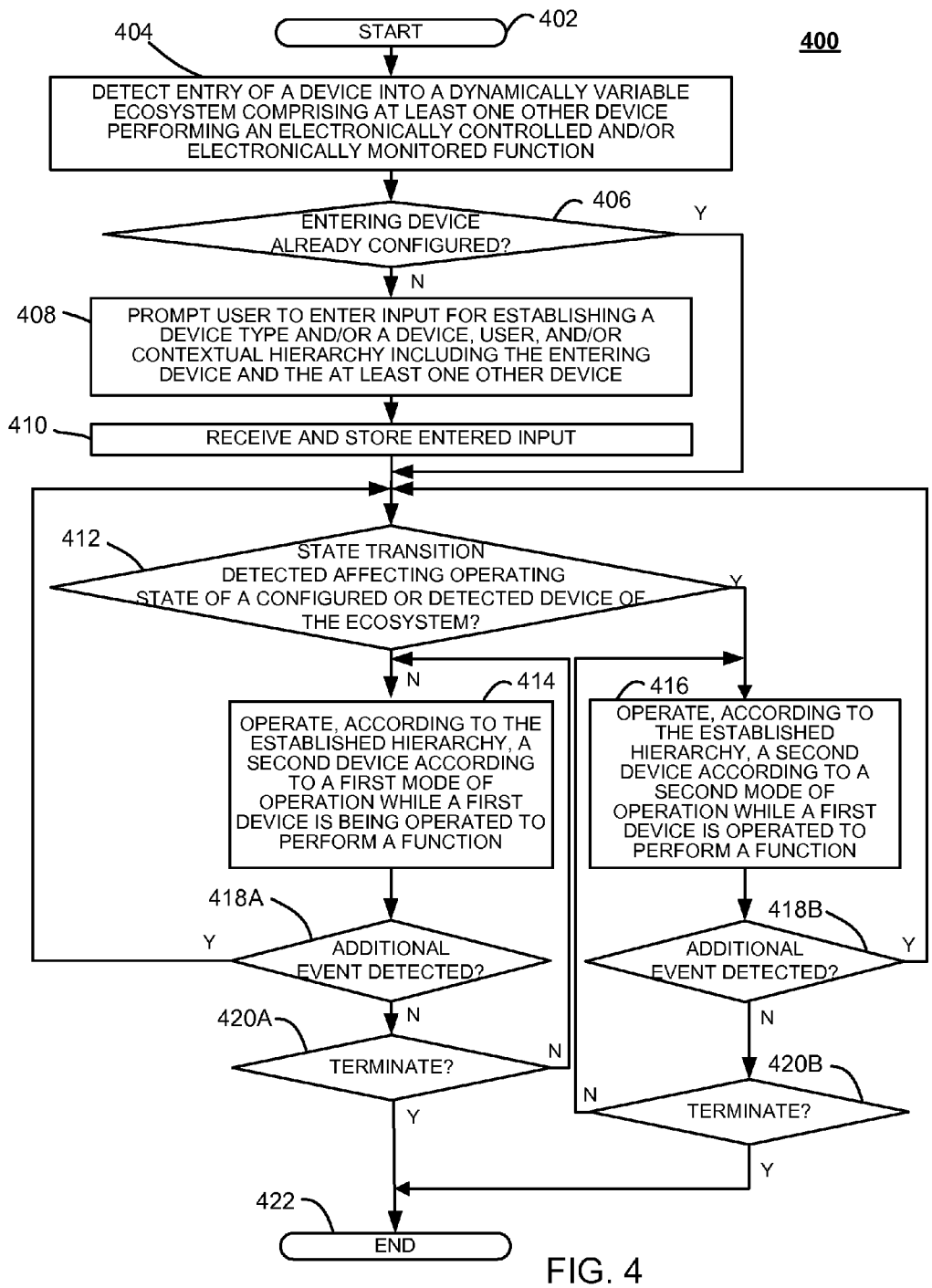
FIG. 4 is a flow diagram for configuring and/or operating at least one device entering and/or already present in a device ecosystem so as to facilitate dynamic coordination of features, functions and or operating mode status of a plurality of electronically controlled and/or monitored devices forming part of that ecosystem, according to an embodiment of the invention.

FIG. 4 is a flow diagram of a method 400 for configuring and/or operating at least one device entering and/or already present in a device ecosystem so as to facilitate dynamic coordination of features, functions and or operating mode status of a plurality of electronically controlled and/or monitored devices forming part of that ecosystem, according to an embodiment of the invention. In the presence of any one of the exemplary triggering events as described above, one or more other electronic devices including at least a second electronic device (e.g., a television, a media player, a digital video player, the receiver of a home audio system, or a personal computer) is/are operated so as to enhance the experience of the user of the first device. By way of example, the second device may be operated at a reduced or muted volume, operated in a paused mode, or operated to provide an enhanced, additional or alternative notification to the user of the first device as the case may be. The notification may be displayed on a display of the second device and/or audibly reproduced at a high volume by the second device while suppressing the audio associated with a temporarily suspended function of the second device.

The method 400 is entered at 402 and proceeds to 404, where activation or entry of a device, into a dynamically variable ecosystem comprising at least one other device configured to perform an electronically controlled and/or electronically monitored function, is detected. The method 400 proceeds to 406, where a determination is made as to whether the activated or entering device is already configured for at least one of dynamically controlled and/or electronically monitored operation in the entered ecosystem. If the determination at 406 is no, the method 400 proceeds to 408, where the display and/or audible presentation of one or more prompts to the user is/are initiated in order to establish the type of device activated or entering the ecosystem and/or in order to establish a contextual hierarchy which includes the entering device and one or more other device(s) already configured to operate, presently operating in the ecosystem, and/or previously identified as having been operated in the ecosystem. From 408, the method 400 proceeds to 410 where user input responsive to the prompt(s) is collected and stored.

From 410, or from 406 if the determination was made at 406 that the activated or entering device was already configured for the ecosystem, the method 400 proceeds to 412. At 412, a determination is made as to whether a state transition event has occurred which affects the operating state and/or feature usability of a detected and/or configured device operating within the ecosystem. If not, then the method 400 proceeds to 414, where operation of a second device, according to its current or default mode of operation proceeds as if the event had not occurred. If so, the method 400 proceeds to 416 and, in some embodiments, the second device is operated according to a mode other than the initial or default mode of operation. In some embodiments, the occurrence of a singular transition event triggers the constrained and/or enhanced operation of the second electronic device (and other electronic devices besides the first electronic device). However, in other embodiments, a transition event is further qualified, as a triggering event, on the basis of user context, device context, whether another event has occurred, and/or whether another condition exists.

For example, in embodiments where the first electronic device is a communication terminal, the operation of a television or sound system in the background may not always warrant dynamic coordination as might occur by default in accordance with other embodiments of the invention. If the user of a microphone and/or speaker equipped first electronic device is standing far enough away from other sound generating devices in the same ecosystem, then the acoustic output of the second device (or devices in the ecosystem having comparable functionality) may be so low as to pose no problem to the user in the absence of some other confounding condition. Examples of such confounding conditions, which together with non-negligible levels of ambient noise might impair use of the first electronic device, include the existence of a poor quality communication link between the first device and a remote communication device and/or a low media playback volume.

From 414 or 416, method 400 proceeds to 418A or 418B, respectively, where a determination is made as to whether an additional transition event and/or operating state change is detected. If so, the method returns to 412 and evaluates the impact of the event of the operating state in the context of the electronic devices being operated within the ecosystem. If not, the method 400 advances from 418A to 420A or 418B to 420B, as the case may be. At 420A or 420B, a determination is made as to whether the method should be terminated. If not, the method 400 returns from 420A to 414 or from 420B to 416, as applicable. If so, the method 400 proceeds from either of 420A or 420B to 422 and terminates.

A rule made enforceable based on default settings and/or user input responsive to one or more prompts, according one or more embodiments, may specify that after a particular triggering event has occurred and while a second device is being operated, the first device, or both the first device and the second device, is/are operated in a different mode (i.e., to perform alternative functions or to use alternate or additional features). In the previously discussed example, where the first device is a communication terminal, the same triggering events (i.e., receipt of an invitation to join a communication session, operation of the first device to accept a call set up invitation, or operation of the first device to send a call setup invitation to a remote party, the first device may respond to a triggering event by operating in a haptic alerting mode rather than or in addition to an audible alerting mode.

Other modes for operating the first device responsive to a state transition event include operation in a mode which causes the first device to generate a louder alerting signal, and/or in a mode by which visible or audible whisper notifications are generated and presented to the user of the first device (e.g., in order to notify the user about the operational status of the second or other devices of the ecosystem). According to some embodiments, if the user is using a first electronic device having a display and/or speaker, occasional notifications regarding unexpired time of an oven, clothes washer, or clothes washer timer, or of a door bell actuation, might be presented as whispered notifications inaudible to the other party or parties to a communication session, or displayed to the display of the first electronic device. One such embodiment is depicted in FIG. 5, which will now be described.

Figure 5:
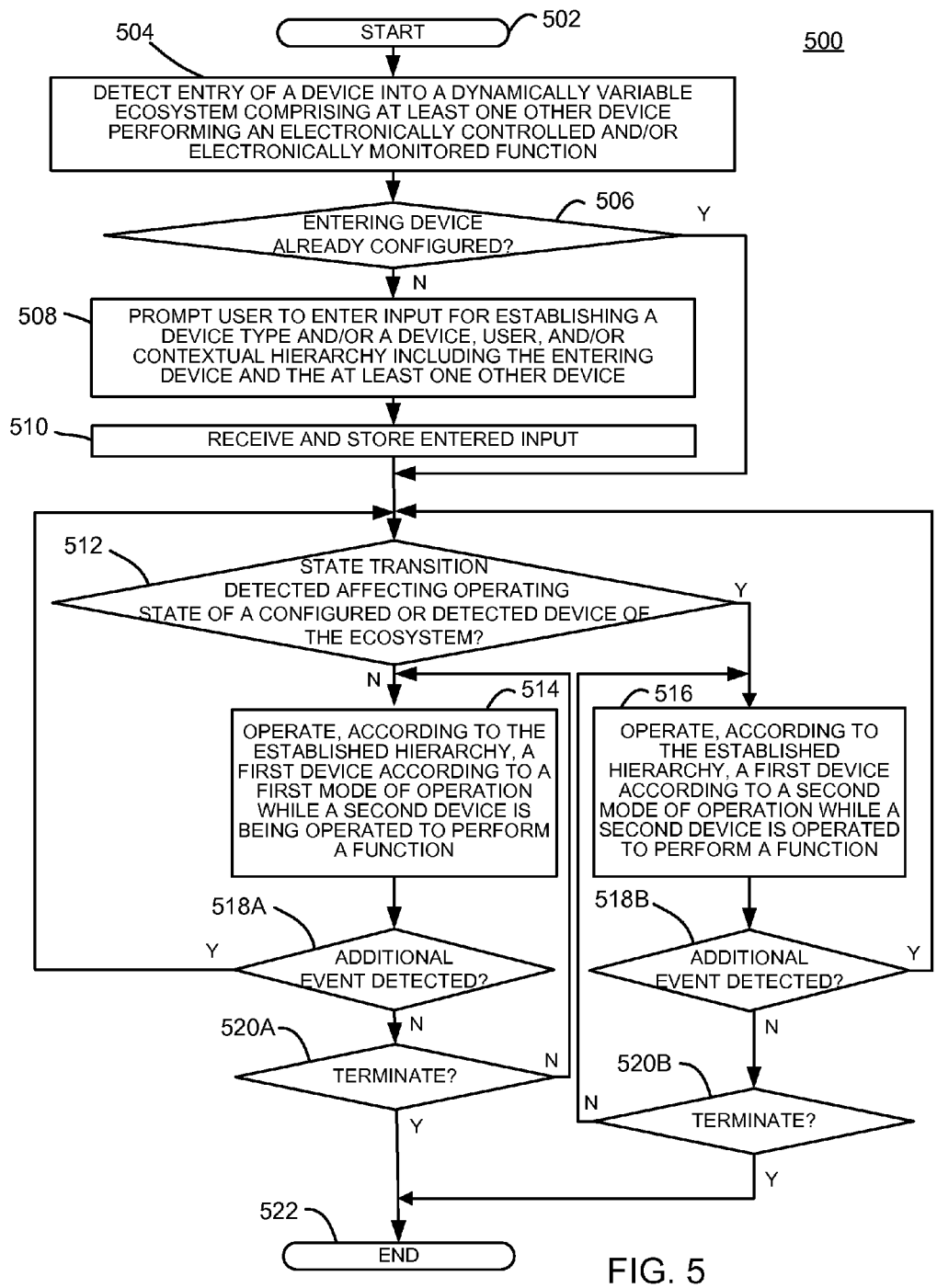
FIG. 5 is a flow diagram for configuring and/or operating at least one device entering and/or already present in a device ecosystem so as to facilitate dynamic coordination of features, functions and or operating mode status of a plurality of electronically controlled and/or monitored devices forming part of that ecosystem, according to another embodiment of the invention.

FIG. 5 is a flow diagram of a method 500 for configuring and/or operating at least one device entering and/or already present in a device ecosystem so as to facilitate dynamic coordination of features, functions and or operating mode status of a plurality of electronically controlled and/or monitored devices forming part of that ecosystem, according to another embodiment of the invention.

In the presence of any one of the exemplary triggering events as described above, one or more electronic devices including at least a first electronic device (e.g., a communication terminal) operates so as to enhance the experience of the user and/or to compensate for deleterious interference which might be experienced at a time when at least a second electronic device (e.g., a television, a media player, a digital video player, the receiver of a home audio system, and/or a personal computer) is/are being operated. In some embodiments, the operation of the first and the second devices may be altered responsive to an event. By way of example, if the first device is a communication terminal such as a smartphone it may be operated at a higher volume while, at the same time, the second device (e.g., a game console or TV set) may be operated at a reduced or muted volume, operated in a paused mode, or operated to provide an enhanced, additional or alternative notification to the user of the first device as the case may be.

The method 500 is entered at 502 and proceeds to 504, where activation or entry of a device, into a dynamically variable ecosystem comprising at least one other device configured to perform an electronically controlled and/or electronically monitored function, is detected. The method 500 proceeds to 506, where a determination is made as to whether the activated or entering device is already configured for at least one of dynamically controlled and/or electronically monitored operation in the entered ecosystem. If the determination at 506 is no, the method 500 proceeds to 508, where the display and/or audible presentation of one or more prompts to the user is/are initiated in order to establish the type of device activated or entering the ecosystem and/or in order to establish a contextual hierarchy which includes the entering device and one or more other device(s) already configured to operate, presently operating in the ecosystem, and/or previously identified as having been operated in the ecosystem. From 508, the method 500 proceeds to 510 where user input responsive to the prompt(s) is collected and stored.

From 510, or from 506 if the determination was made at 506 that the activated or entering device was already configured for the ecosystem, the method 500 proceeds to 512. At 512, a determination is made as to whether a state transition event has occurred which affects the operating state and/or feature usability of a detected and/or configured device operating within the ecosystem. If not, then the method 500 proceeds to 514, where operation of a first device according to its current or default mode of operation proceeds as if the event had not occurred. In some embodiments, both the first and second devices are operated according to their respective current or default modes as if the event did not occur.

If such an event is determined to have occurred at 512, then the method 500 proceeds to 516 and, in some embodiments, the first device is operated according to a mode other than the initial or default mode of operation. In other embodiments, both the first device and the second device are operated according to modes respectively different than their corresponding initial or default modes of operation.

In some embodiments, the occurrence of a singular transition event triggers the constrained and/or enhanced operation of the first and/or the first and the second electronic device (as well as such other electronic devices as may be specified for a particular combination of devices and state transition event(s). However, in other embodiments, a state transition event is further qualified, as a triggering event, on the basis of user context, device context, whether another event has occurred, and/or whether another condition exists.

From 514 or 516, method 500 proceeds to 518A or 518B, respectively, where a determination is made as to whether an additional transition event and/or operating state change is detected. If so, the method returns to 512 and evaluates the impact of the event of the operating state in the context of the electronic devices being operated within the ecosystem. If not, the method 500 advances from 518A to 520A, or from 518B to 520B. At 520A or 520B, a determination is made as to whether the method should be terminated. If not, the method 500 returns from 518A to 514 or from 518B to 516, as applicable. If so, the method 500 proceeds from either of 520A or 520B to 522 and terminates.

Figure 6A:
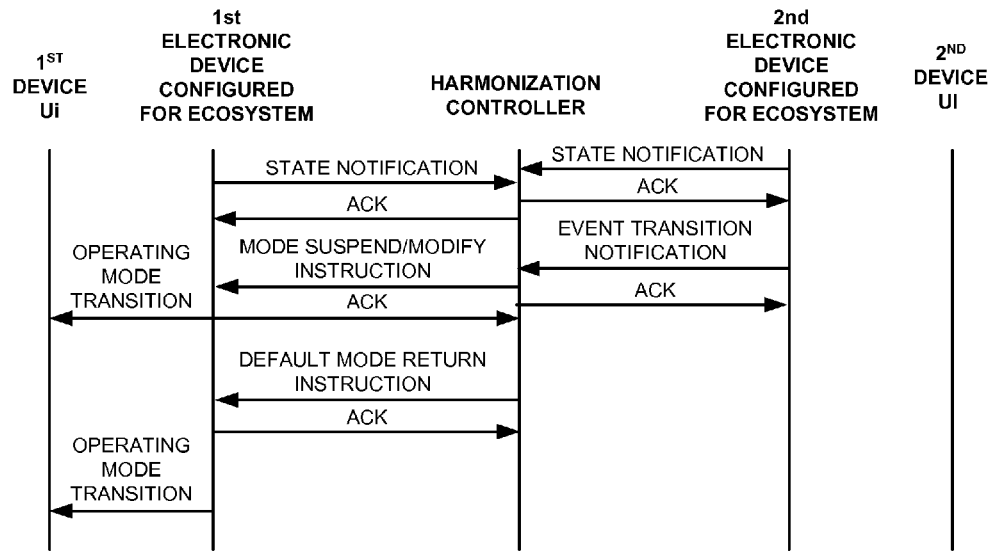
FIG. 6A is a message flow diagram depicting centralized coordination of operating mode transitions of a first device based on tracked state changes and/or event transitions affecting at least a second device in accordance with the exemplary embodiment of FIG. 5.
Figure 6B:
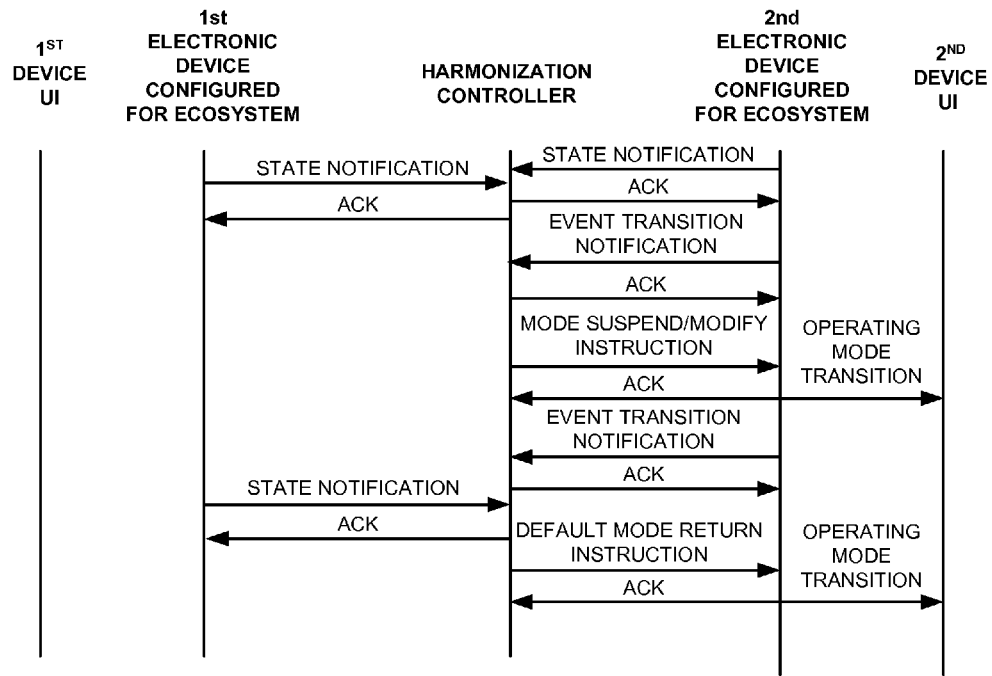
FIG. 6B is a message flow diagram depicting centralized coordination of operating mode transitions of a first device based on tracked state changes and/or event transitions affecting at least a second device in accordance with the exemplary embodiment of FIG. 4.

FIG. 6A is a message flow diagram depicting centralized coordination of operating mode transitions of a first device based on tracked state changes and/or event transitions affecting at least a second device in accordance with the exemplary embodiment of FIG. 5. FIG. 6B, on the other hand, is a message flow diagram depicting centralized coordination of operating mode transitions of a first device based on tracked state changes and/or event transitions affecting at least a second device in accordance with the exemplary embodiment of FIG. 4.

FIG. 7A depicts the user interface displayed by a device 702 operated by a user and presenting a prompt for the user to enter input for establishing a subset of devices, in a detected ecosystem, to be coordinated based on the preferences of that user, according to one or more embodiments. As previously indicated, the underlying steps of detecting other devices in an ecosystem, identifying those devices by type, accessing the profiles for those devices, and determining which of the detected devices are dynamically configurable can be performed centrally by a stand-alone harmonization controller or by one of the devices (as device 702) configured to perform the role of a harmonization controller in addition to a set of one or more functions or features having utility to users. Alternatively, the aforementioned coordination functions may be distributed among multiple devices of the ecosystem. In the exemplary embodiment of FIGS. 7A to 7D, the device 702 is a portable communication terminal such, for example, as a smartphone, tablet computer, or wearable computer.

As shown in FIG. 7A, a list of those electronically controlled and/or monitored devices determined to be present in the ecosystem in which device 702 is already present (or has just entered) is rendered to the display 704 of device 702. The devices listed may include dynamically configurable devices (e.g., devices whose features and/or operating characteristics can be modified responsive to instructions transmitted by and/or received from a controller or other device) or non-configurable devices (e.g., devices which can be detected and identified, and whose operating state can be determined by a central or distributed controller, but whose operating state cannot be dynamically controlled to coordinate with other devices of the ecosystem). Radio buttons are rendered to display 704 for the user to select or de-select devices, from the detected subset of devices in the ecosystem, to be coordinated. As well, soft feature buttons 706 and 708 are rendered to the display 704 for the user to confirm the entered choices or to cancel the operation.

FIG. 7B depicts the device 702 of FIG. 7A operated by a user to present a default device hierarchy and optionally reorder the hierarchy to suit the preferences of the user, according to some embodiments. Presented with the combination of ecosystem devices selected by operation of device 702 as prompted in FIG. 7A, the user is presented in FIG. 7B with a default hierarchy and further prompted to either confirm that hierarchy or re-arrange the devices to suit the user's own preferences. Where the preferences of more than one user must be accommodated, a user may be further prompted to designate a user hierarchy as well as a device hierarchy. After making any changes to the default hierarchy, the user may confirm or cancel as before, using buttons 706 and 708 respectively, or he or she may use button 710 to go back to the prior screen.

FIG. 7C depicts the device 702 of FIGS. 7A and 7B operated by a user to select, for further evaluation and/or modification, a subset of ecosystem devices and a default set of coordination settings applicable to that subset, according to some embodiments. For example, a user may wish to see how certain events (e.g., an incoming phone call, receipt of an SMS text message) will impact, if at all, any other devices of the selected subset.

FIG. 7D depicts the device 702 of FIGS. 7A to 7C operated by a user to select and to view the current (e.g., default) configuration settings of a selected subset of devices forming part of the ecosystem so as to understand the impact, if any, operation of each of the devices to perform one or more functions or features will have on other devices of the subset in response to the occurrence of a specified event. In some embodiments, a separate screen is provided for each event. For example, in the example of FIG. 7D, the event being referred to in the display is the receipt of an incoming call by device 702. A further event might be receipt of an SMS text message, as noted above, receipt of an incoming call invitation from a specific caller or category of callers, and so on. For a different device, such for example, as a game console or TV, the user may wish to specify a "send directly to voicemail" or even a "reject call" action when calls with an unidentified caller are received. In some embodiments, a set of one or more pages is rendered to the display to show the impact of respective events on the selected device and, if applicable, on other selected devices.

The embodiments of the present invention may be embodied as methods, apparatus, electronic devices, and/or computer program products. Accordingly, the embodiments of the present invention may be embodied in hardware and/or in software (including firmware, resident software, microcode, and the like), which may be generally referred to herein as a "circuit" or "module". Furthermore, embodiments of the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of embodiments of the present invention may be written in an object oriented programming language, such as Java®, Smalltalk or C++, and the like. However, the computer program code for carrying out operations of embodiments of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit embodiments of the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 8:
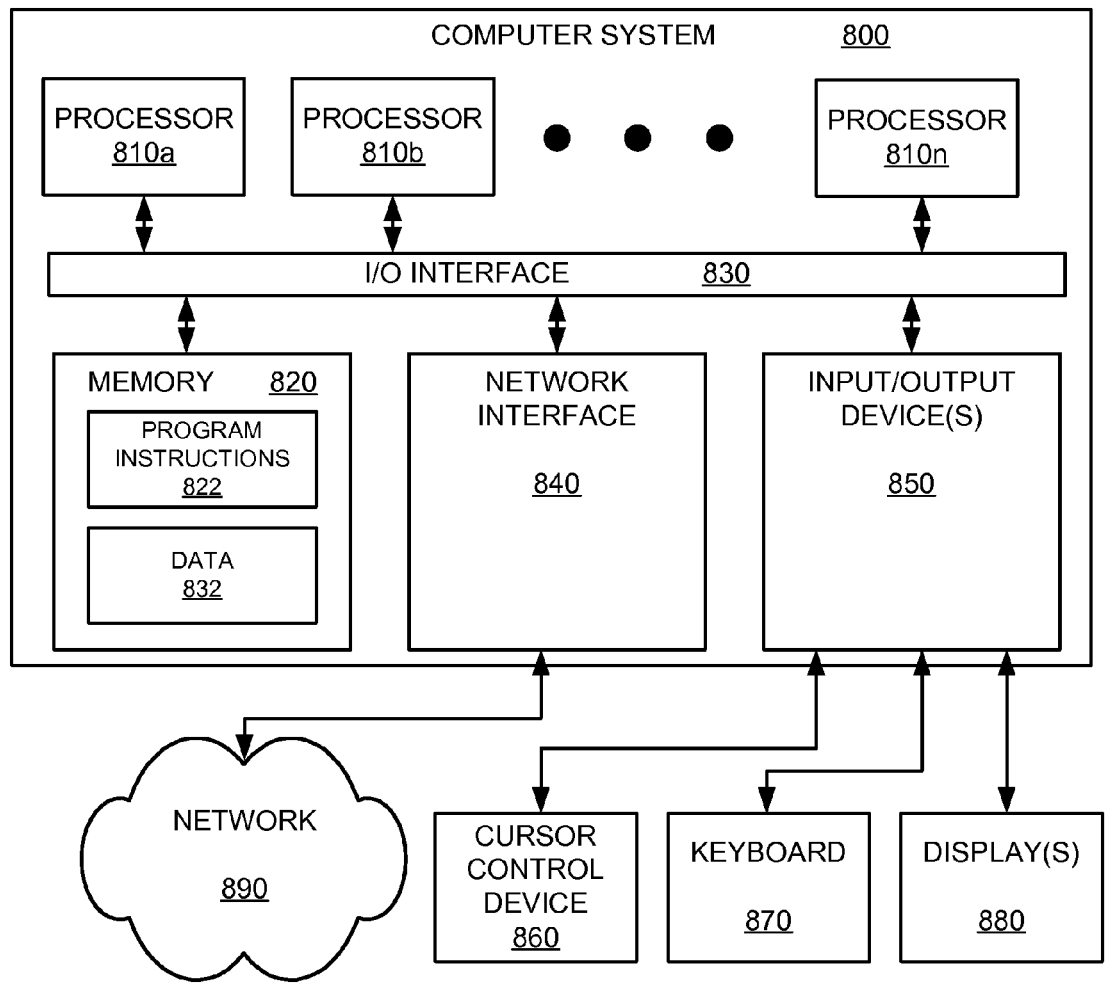
FIG. 8 is a detailed block diagram of a computer system for implementing, for example, the harmonization controller of FIGS. 1A and 1C, according to one or more embodiments.

FIG. 8 is a detailed block diagram of a computer system, according to one or more embodiments, that can be utilized in various embodiments of the present invention to implement the computer and/or the display devices, according to one or more embodiments.

Various embodiments of methods and apparatus for dynamically coordinating the overall operation, specific functions and/or specific features of a plurality of electronically controlled and/or electronically monitored devices in an ecosystem, as described herein, may be executed on one or more computer systems, which may interact with various other devices or even form part of one or more of the devices of the ecosystem. One such computer system is computer system 800 illustrated by FIG. 8, which may in various embodiments implement any of the elements or functionality illustrated in FIGS. 1A-7D. In various embodiments, computer system 800 may be configured to implement methods described above. The computer system 800 may be used to implement any other system, device, element, functionality or method of the above-described embodiments. In the illustrated embodiments, computer system 800 may be configured to implement method 300 (FIG. 3), method 400 (FIG. 4), method 500 (FIG. 5), and/or some or all of the processes depicted in FIGS. 6A and 6B as processor-executable executable program instructions 822 (e.g., program instructions executable by processor(s) 810) in various embodiments.

In the illustrated embodiment, computer system 800 includes one or more processors 810a-810n coupled to a system memory 820 via an input/output (I/O) interface 830. Computer system 800 further includes a network interface 840 coupled to I/O interface 830, and one or more input/output devices 850, such as cursor control device 860, keyboard 870, and display(s) 880. In various embodiments, any of the components may be utilized by the system to receive user input described above. In various embodiments, a user interface may be generated and displayed on display 880. In some cases, it is contemplated that embodiments may be implemented using a single instance of computer system 800, while in other embodiments multiple such systems, or multiple nodes making up computer system 800, may be configured to host different portions or instances of various embodiments. For example, in one embodiment some elements may be implemented via one or more nodes of computer system 800 that are distinct from those nodes implementing other elements. In another example, multiple nodes may implement computer system 800 in a distributed manner.

In different embodiments, computer system 800 may be any of various types of devices, including, but not limited to, a personal computer system, desktop computer, laptop, notebook, or netbook computer, mainframe computer system, handheld computer, workstation, network computer, a set top box, a mobile device such as a smartphone or PDA, a consumer device, video game console, handheld video game device, application server, storage device, a peripheral device such as a switch, modem, router, or in general any type of computing or electronic device.

In various embodiments, computer system 800 may be a uniprocessor system including one processor 810, or a multiprocessor system including several processors 810 (e.g., two, four, eight, or another suitable number). Processors 810 may be any suitable processor capable of executing instructions. For example, in various embodiments processors 810 may be general-purpose or embedded processors implementing any of a variety of instruction set architectures (ISAs). In multiprocessor systems, each of processors 810 may commonly, but not necessarily, implement the same ISA.

System memory 820 may be configured to store program instructions 822 and/or data 832 accessible by processor 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 820. In other embodiments, program instructions and/or data may be received, sent or stored upon different types of computer-accessible media or on similar media separate from system memory 820 or computer system 800.

In one embodiment, I/O interface 830 may be configured to coordinate I/O traffic between processor 810, system memory 820, and any peripheral devices in the device, including network interface 840 or other peripheral interfaces, such as input/output devices 850. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices attached to a network (e.g., network 890), such as one or more display devices (not shown), or one or more external systems or between nodes of computer system 800. In various embodiments, network 890 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 840 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 850 may, in some embodiments, include one or more communication terminals, keyboards, keypads, touchpads, scanning devices, voice or optical recognition devices, or any other devices suitable for entering or accessing data by one or more computer systems 800. Multiple input/output devices 850 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 840.

In some embodiments, the illustrated computer system may implement any of the methods described above, such as the methods illustrated by the flowcharts of FIGS. 3-5. In other embodiments, different elements and data may be included.

Those skilled in the art will appreciate that computer system 800 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

What is claimed is:

1. A method for dynamically controlling an electronic device, comprising the steps of:
   storing, in a memory of a central controller, user input for automatically controlling operation of a first electronic device of a plurality of electronic devices while a second electronic device of the plurality of electronic devices is being operated;
   detecting, by a processor of the central controller, a first state transition event affecting an operating state of the second electronic device; and
   based on the stored input and detected state transition event, at least one of processing or transmitting instructions for at least one of modifying or suspending operation of at least one feature of the first electronic device.

2. The method of claim 1, further comprising the step of at least one of audibly reproducing or initiating display of a prompt for a user as input for the storing.

3. The method of claim 2, wherein the prompt comprises, for at least one of the first and second electronic devices, at least one of a priority level for establishing an operating hierarchy among other of the plurality of electronic devices or a device type.

4. The method of claim 1, further including the steps of:
   prior to occurrence of the first state transition event, operating the second electronic device according to a first mode of operation while the first electronic device is being operated; and
   upon occurrence of the first state transition event, operating the second electronic device according to a second mode of operation while the second electronic device is being operated.

5. The method of claim 4, wherein the first electronic device is a portable communication device having a housing, a display, a microphone, and a speaker, and wherein the first state transition event comprises receipt of an invitation to join a communication session using the first electronic device.

6. The method of claim 5, wherein the first mode of operation comprises the step of audibly producing an audible output at a first volume level and wherein the second mode of operation comprises one of the steps of producing an audible output at a reduced volume level less than the first volume level or no audible output.

7. The method of claim 5, wherein the first mode of operation comprises transmitting a rejection of the invitation while the first electronic device is being operated.

8. The method of claim 7, wherein the second mode of operation comprises the step of transmitting an acceptance of the invitation while the first electronic device is not being operated.

9. The method of claim 4, wherein the operation of the second electronic device by a user is inconsistent with simultaneous operation of the first electronic device.

10. The method of claim 4, wherein the operation of the first electronic device is one of an electronically operated water control valve or an electronic water flow sensor.

11. The method of claim 1, wherein the first and second devices are part of a same static or dynamic ecosystem.

12. The method of claim 11, further including the step of determining, at a central controller, whether operation of at least one of the first electronic device or the second electronic device should be modified or suspended.

13. The method of claim 1, wherein the storing, detecting and processing of at least some of the instructions are performed at one of the first electronic device and the second electronic device.

14. A system for dynamically controlling at least one of a plurality of electronic devices in proximity with one another, comprising:
 a first electronic device of the plurality of electronic devices;
 a second electronic device of the plurality of electronic devices; and
 a central controller comprising:
  a user interface comprising at least one of a display or a speaker for presentation of at least one of alerts or prompts;
  at least one processor; and
  a memory containing instructions, which when executed by the processor, perform a method to:
   store user input for automatically controlling operation of a first electronic device of the plurality of electronic devices while a second electronic device of the plurality of electronic devices is being operated;
   detect, by execution of instructions by the at least one processor, a first state transition event affecting an operating state of the second electronic device; and
   based on the stored input and detected state transition event, at least one of processing or transmitting instructions for at least one of modifying or suspending operation of at least one feature of the first electronic devices.

15. The system of claim 14, wherein the memory further contains instructions, which when executed by the processor, further perform the method to at least one of audibly reproduce or initiate display of a prompt for a user as input for the storing.

16. The system of claim 14, wherein the memory further contains instructions, which when executed by the at least one processor, further perform the method to:
 initiate operation of the second electronic device, prior to occurrence of the first state transition event, according to a first mode of operation while the first electronic device is being operated; and
 initiate operation of the second electronic device according to a second mode of operation, responsive to occurrence of the first state transition event, while the second electronic device is being operated.

17. The system of claim 16, wherein the first electronic device is a portable communication device having a housing, a display, a microphone, and a speaker, and wherein the first state transition event comprises receipt of an invitation to join a communication session using the first electronic device.

18. The system of claim 16, wherein the first mode of operation comprises an audible output at a first volume level and wherein the second mode of operation comprises one of an audible output at a reduced volume level less than the first volume level or no audible output.

19. The system of claim 17, wherein the first mode of operation comprises transmitting a rejection of the invitation while the first electronic device is being operated.

20. The system of claim 19, wherein the second mode of operation comprises transmitting an acceptance of the invitation while the first electronic device is not being operated.

21. The system of claim 16, wherein the central controller comprises a communication interface for communicating with at least the first and second electronic devices of the plurality of electronic devices, and wherein the memory contains instructions for performing the storing at the central controller.

22. The system of claim 21, wherein the memory further contains instructions for determining, at the central controller, whether operation of at least one of the first electronic device or the second electronic device should be modified or suspended.

23. The system of claim 14, wherein at least one of the first or second electronic devices includes the at least one processor, and wherein instructions for storing, detecting and processing or transmitting are executable at one of the first electronic device or the second electronic device.

24. A central controller for dynamically controlling at least one of a plurality of electronic devices in proximity with one another, comprising:
 a) at least one input device;
 b) at least one processor; and
 c) at least one storage device storing processor-executable instructions which, when executed by the at least one processor, perform a method including:
  presenting at least one of alerts or prompts to a user of at least one of the plurality of electronic devices;
  automatically controlling operation of a first electronic device of the plurality of electronic devices while a second electronic device of the plurality of electronic devices is being operated;
  detecting a first state transition event affecting an operating state of at least one of the first or second electronic devices; and
  at least one of modifying or suspending operation, based on stored instructions provided by a use and a detected state transition event, of at least one feature of the first and second electronic devices.

* * * * *